(12) United States Patent
Kelley et al.

(10) Patent No.: US 9,026,639 B2
(45) Date of Patent: May 5, 2015

(54) HOME NETWORK OPTIMIZING SYSTEM

(75) Inventors: Steve Kelley, Seattle, WA (US); Jeremy Wilson, Seattle, WA (US); Jeff Erwin, Seattle, WA (US)

(73) Assignee: Pure Networks LLC, Wilmington, DE (US)

( * ) Notice: Subject to any disclaimer, the term of this patent is extended or adjusted under 35 U.S.C. 154(b) by 63 days.

(21) Appl. No.: 11/867,678

(22) Filed: Oct. 4, 2007

(65) Prior Publication Data

US 2009/0052338 A1    Feb. 26, 2009

Related U.S. Application Data

(60) Provisional application No. 60/949,628, filed on Jul. 13, 2007.

(51) Int. Cl.
  *G06F 15/173* (2006.01)
  *H04L 12/26* (2006.01)
  *H04L 12/28* (2006.01)

(52) U.S. Cl.
  CPC ......... *H04L 43/0876* (2013.01); *H04L 12/2803* (2013.01); *H04L 43/16* (2013.01)

(58) Field of Classification Search
  USPC .......... 709/223–224, 247, 230; 455/445, 466; 370/398, 235, 236, 241, 252, 395.21, 370/401, 234, 395.32; 717/172; 713/201; 726/12, 22; 379/269; 707/102
  See application file for complete search history.

(56) References Cited

U.S. PATENT DOCUMENTS

| 5,383,178 A | 1/1995 | Unverrich |
| 5,396,485 A | 3/1995 | Ohno et al. |

(Continued)

FOREIGN PATENT DOCUMENTS

| EP | 1315334 | 5/2003 |
| EP | 1370025 | 12/2003 |

(Continued)

OTHER PUBLICATIONS

PCT Notification of the International Search Report and the Written Opinion of the International Searching Authority, or the Declaration, International Application No. PCT/US2008/063318, mailed Sep. 25, 2008, 6 pgs.

(Continued)

*Primary Examiner* — Imad Hussain
(74) *Attorney, Agent, or Firm* — Patent Capital Group

(57) ABSTRACT

A system for optimizing a network having a plurality of network devices. The system includes a network monitoring tool simultaneously executable on at least one of the network devices and configured to diagnose a condition of the network. The network monitoring tool includes an information collection module configured to collect an information set relating to performance of each of the network devices, an action module configured to execute an action in response to the information set, the action relating to a diagnosed condition of the network, and an information transmission module configured to transmit the information set to an electronic device remote from the network. The system further includes a configuring tool executable on a server computing device. The configuring tool includes an information receiving module configured to receive the information set, and a programming module configured to configure the network monitoring tool based on the received collected information.

20 Claims, 6 Drawing Sheets

(56) References Cited

U.S. PATENT DOCUMENTS

| | | |
|---|---|---|
| 5,420,572 A | 5/1995 | Dolin et al. |
| 5,712,914 A | 1/1998 | Aucsmith et al. |
| 5,758,083 A | 5/1998 | Singh et al. |
| 5,768,483 A | 6/1998 | Maniwa et al. |
| 5,774,667 A | 6/1998 | Garvey et al. |
| 5,838,907 A | 11/1998 | Hansen |
| 5,974,237 A | 10/1999 | Shurmer et al. |
| 5,978,568 A | 11/1999 | Abraham et al. |
| 6,006,272 A | 12/1999 | Aravamudan et al. |
| 6,023,723 A | 2/2000 | McCormick et al. |
| 6,157,950 A | 12/2000 | Krishnan |
| 6,456,306 B1 | 9/2002 | Chin et al. |
| 6,530,018 B2 | 3/2003 | Fleming |
| 6,584,074 B1 | 6/2003 | Vasamsetti et al. |
| 6,631,118 B1* | 10/2003 | Jones .................. 370/252 |
| 6,678,250 B1* | 1/2004 | Grabelsky et al. .......... 370/241 |
| 6,728,262 B1 | 4/2004 | Woram |
| 6,778,505 B1 | 8/2004 | Bullman et al. |
| 6,801,941 B1 | 10/2004 | Stephens et al. |
| 6,892,245 B1 | 5/2005 | Crump et al. |
| 6,925,085 B1* | 8/2005 | Krishna et al. .......... 370/395.32 |
| 6,954,785 B1 | 10/2005 | Martin et al. |
| 6,965,614 B1 | 11/2005 | Osterhout et al. |
| 6,980,556 B2 | 12/2005 | Vimpari |
| 7,020,701 B1* | 3/2006 | Gelvin et al. .............. 709/224 |
| 7,020,720 B1 | 3/2006 | Donahue et al. |
| 7,027,808 B2 | 4/2006 | Wesby |
| 7,039,688 B2 | 5/2006 | Matsuda et al. |
| 7,042,988 B2 | 5/2006 | Juitt et al. |
| 7,046,139 B2 | 5/2006 | Kuhn et al. |
| 7,080,141 B1 | 7/2006 | Baekelmans et al. |
| 7,111,054 B2 | 9/2006 | Lo |
| 7,155,493 B1 | 12/2006 | Weber |
| 7,177,957 B2 | 2/2007 | Vance |
| 7,187,461 B2 | 3/2007 | Schlonski et al. |
| 7,200,551 B1 | 4/2007 | Senez |
| 7,240,106 B2 | 7/2007 | Cochran et al. |
| 7,249,171 B2 | 7/2007 | Goto |
| 7,269,653 B2 | 9/2007 | Mentze et al. |
| 7,283,517 B2 | 10/2007 | Yan et al. |
| 7,310,664 B1 | 12/2007 | Merchant et al. |
| 7,337,910 B2 | 3/2008 | Cartmell et al. |
| 7,340,512 B2 | 3/2008 | Cochran et al. |
| 7,388,839 B2* | 6/2008 | Chafle et al. .......... 370/236 |
| 7,418,702 B2 | 8/2008 | Tsao |
| 7,421,466 B2 | 9/2008 | Haines |
| 7,457,737 B2 | 11/2008 | Patiejunas |
| 7,460,546 B2* | 12/2008 | Anderson, IV .......... 370/401 |
| 7,475,133 B2 | 1/2009 | Nuggehalli |
| 7,496,660 B2 | 2/2009 | Blaisdell et al. |
| 7,499,999 B2 | 3/2009 | Ocepek et al. |
| 7,506,048 B1 | 3/2009 | Motoyama et al. |
| 7,509,415 B2 | 3/2009 | Baekelmans et al. |
| 7,545,762 B1 | 6/2009 | McConnell et al. |
| 7,565,418 B2 | 7/2009 | Ferrari et al. |
| 7,581,039 B2 | 8/2009 | Martinez et al. |
| 7,603,710 B2 | 10/2009 | Harvey et al. |
| 7,657,612 B2 | 2/2010 | Manchester et al. |
| 7,769,409 B2 | 8/2010 | Harris et al. |
| 7,783,777 B1 | 8/2010 | Pabla et al. |
| 7,787,416 B2 | 8/2010 | Gidwani |
| 7,823,199 B1 | 10/2010 | Rathi et al. |
| 7,853,880 B2 | 12/2010 | Porter |
| 7,962,605 B2 | 6/2011 | Chen |
| 8,159,949 B2* | 4/2012 | Pharn ............... 370/234 |
| 8,660,019 B2* | 2/2014 | Schryer et al. ........... 370/252 |
| 2001/0039580 A1 | 11/2001 | Walker et al. |
| 2002/0004935 A1 | 1/2002 | Huotari et al. |
| 2002/0010866 A1* | 1/2002 | McCullough et al. ......... 713/201 |
| 2002/0026503 A1 | 2/2002 | Bendinelli et al. |
| 2002/0026505 A1 | 2/2002 | Terry |
| 2002/0112076 A1 | 8/2002 | Rueda et al. |
| 2002/0116544 A1 | 8/2002 | Barnard et al. |
| 2002/0147938 A1 | 10/2002 | Hamilton et al. |
| 2002/0161865 A1 | 10/2002 | Nguyen |
| 2002/0161867 A1 | 10/2002 | Cochran et al. |
| 2002/0174207 A1 | 11/2002 | Battou |
| 2002/0191556 A1 | 12/2002 | Krishnarajah et al. |
| 2002/0194305 A1 | 12/2002 | Sadeghi et al. |
| 2002/0196463 A1 | 12/2002 | Schlonski et al. |
| 2003/0005112 A1* | 1/2003 | Krautkremer .............. 709/224 |
| 2003/0018889 A1 | 1/2003 | Burnett et al. |
| 2003/0033402 A1 | 2/2003 | Battat et al. |
| 2003/0040813 A1 | 2/2003 | Gonzales et al. |
| 2003/0041238 A1 | 2/2003 | French et al. |
| 2003/0055953 A1 | 3/2003 | Motoyama et al. |
| 2003/0061336 A1 | 3/2003 | Van Den Bosch et al. |
| 2003/0069947 A1 | 4/2003 | Lipinski |
| 2003/0078965 A1 | 4/2003 | Cocotis et al. |
| 2003/0078999 A1 | 4/2003 | Lund et al. |
| 2003/0086425 A1 | 5/2003 | Bearden et al. |
| 2003/0097439 A1* | 5/2003 | Strayer et al. .............. 709/224 |
| 2003/0115298 A1 | 6/2003 | Baker |
| 2003/0115314 A1 | 6/2003 | Kawashima |
| 2003/0187985 A1 | 10/2003 | Rohling et al. |
| 2003/0195937 A1 | 10/2003 | Kircher et al. |
| 2003/0200303 A1 | 10/2003 | Chong |
| 2003/0200318 A1 | 10/2003 | Chen et al. |
| 2003/0221122 A1 | 11/2003 | Hatori |
| 2003/0229688 A1 | 12/2003 | Liang |
| 2004/0003292 A1 | 1/2004 | Kato |
| 2004/0005873 A1 | 1/2004 | Groenendaal et al. |
| 2004/0015575 A1 | 1/2004 | Motoyama |
| 2004/0019675 A1* | 1/2004 | Hebeler et al. .............. 709/224 |
| 2004/0030620 A1 | 2/2004 | Benjamin et al. |
| 2004/0039704 A1 | 2/2004 | Gilliam et al. |
| 2004/0040023 A1 | 2/2004 | Ellis et al. |
| 2004/0049714 A1* | 3/2004 | Marples et al. .............. 714/43 |
| 2004/0064558 A1 | 4/2004 | Miyake |
| 2004/0083299 A1* | 4/2004 | Dietz et al. .............. 709/230 |
| 2004/0093383 A1 | 5/2004 | Huang et al. |
| 2004/0111505 A1 | 6/2004 | Callahan et al. |
| 2004/0139183 A1* | 7/2004 | Motoyama et al. .......... 709/223 |
| 2004/0146006 A1* | 7/2004 | Jackson .............. 370/230 |
| 2004/0155899 A1 | 8/2004 | Conrad |
| 2004/0156346 A1 | 8/2004 | O'Neill |
| 2004/0162986 A1 | 8/2004 | Metzger |
| 2004/0172469 A1 | 9/2004 | Takahashi et al. |
| 2004/0193709 A1* | 9/2004 | Selvaggi et al. ............. 709/224 |
| 2004/0199630 A1* | 10/2004 | Sarkissian et al. .......... 709/224 |
| 2004/0199647 A1 | 10/2004 | Ramarao |
| 2004/0203592 A1 | 10/2004 | Kermode et al. |
| 2004/0204051 A1 | 10/2004 | Scott et al. |
| 2004/0228277 A1* | 11/2004 | Williams .............. 370/230 |
| 2004/0236759 A1 | 11/2004 | Young |
| 2004/0255023 A1 | 12/2004 | Motoyama |
| 2005/0004866 A1 | 1/2005 | Bonalle et al. |
| 2005/0005013 A1 | 1/2005 | Saint-Hilaire et al. |
| 2005/0018241 A1 | 1/2005 | Azami |
| 2005/0050189 A1* | 3/2005 | Yang .............. 709/223 |
| 2005/0050190 A1* | 3/2005 | Dube .............. 709/223 |
| 2005/0054326 A1 | 3/2005 | Rogers |
| 2005/0060535 A1 | 3/2005 | Bartas |
| 2005/0063350 A1 | 3/2005 | Choudhury et al. |
| 2005/0078681 A1 | 4/2005 | Sanuki et al. |
| 2005/0085244 A1 | 4/2005 | Choi et al. |
| 2005/0086197 A1 | 4/2005 | Boubez et al. |
| 2005/0086282 A1 | 4/2005 | Anderson et al. |
| 2005/0091504 A1 | 4/2005 | Shirogane |
| 2005/0111420 A1 | 5/2005 | Fuji |
| 2005/0114490 A1 | 5/2005 | Redlich et al. |
| 2005/0125527 A1 | 6/2005 | Lu et al. |
| 2005/0149626 A1 | 7/2005 | Manchester et al. |
| 2005/0160138 A1 | 7/2005 | Ishidoshiro |
| 2005/0165828 A1* | 7/2005 | Lango et al. ............. 707/102 |
| 2005/0165919 A1 | 7/2005 | Qian et al. |
| 2005/0184852 A1 | 8/2005 | Lee et al. |
| 2005/0198221 A1 | 9/2005 | Manchester et al. |
| 2005/0198274 A1* | 9/2005 | Day .............. 709/224 |
| 2005/0216602 A1 | 9/2005 | Armstrong et al. |
| 2005/0228881 A1 | 10/2005 | Reasor et al. |
| 2005/0229238 A1 | 10/2005 | Ollis et al. |
| 2005/0234568 A1 | 10/2005 | Chung et al. |
| 2005/0234683 A1 | 10/2005 | Graves et al. |

(56) References Cited

U.S. PATENT DOCUMENTS

| | | | |
|---|---|---|---|
| 2005/0235227 A1 | 10/2005 | Martineau et al. | |
| 2005/0240665 A1 | 10/2005 | Gu et al. | |
| 2005/0240758 A1 | 10/2005 | Lord et al. | |
| 2005/0243777 A1 | 11/2005 | Fong | |
| 2006/0015939 A1 | 1/2006 | Aston et al. | |
| 2006/0030328 A1* | 2/2006 | Zhang et al. | 455/445 |
| 2006/0031457 A1 | 2/2006 | Motoyama | |
| 2006/0036847 A1 | 2/2006 | Bush et al. | |
| 2006/0037036 A1 | 2/2006 | Min et al. | |
| 2006/0037075 A1* | 2/2006 | Frattura et al. | 726/22 |
| 2006/0041891 A1 | 2/2006 | Aaron | |
| 2006/0101109 A1 | 5/2006 | Nishio | |
| 2006/0106918 A1 | 5/2006 | Evert et al. | |
| 2006/0120293 A1 | 6/2006 | Wing | |
| 2006/0129664 A1* | 6/2006 | Reimert et al. | 709/223 |
| 2006/0136424 A1 | 6/2006 | Nuggehalli et al. | |
| 2006/0153080 A1 | 7/2006 | Palm | |
| 2006/0168167 A1 | 7/2006 | Kushalnagar et al. | |
| 2006/0168195 A1* | 7/2006 | Maturana et al. | 709/224 |
| 2006/0168263 A1 | 7/2006 | Blackmore | |
| 2006/0172734 A1 | 8/2006 | Tak et al. | |
| 2006/0258341 A1 | 11/2006 | Miller | |
| 2006/0272014 A1* | 11/2006 | McRae et al. | 726/12 |
| 2006/0277291 A1 | 12/2006 | Misbach | |
| 2006/0280189 A1 | 12/2006 | McRae et al. | |
| 2006/0291443 A1 | 12/2006 | Harrington et al. | |
| 2007/0015463 A1 | 1/2007 | Abel | |
| 2007/0022185 A1 | 1/2007 | Hamilton et al. | |
| 2007/0058567 A1 | 3/2007 | Harrington et al. | |
| 2007/0074125 A1 | 3/2007 | Platt et al. | |
| 2007/0076621 A1* | 4/2007 | Malhotra et al. | 370/252 |
| 2007/0094390 A1 | 4/2007 | Nussey | |
| 2007/0106768 A1* | 5/2007 | Frietsch et al. | 709/223 |
| 2007/0111568 A1 | 5/2007 | Ferrari et al. | |
| 2007/0115950 A1 | 5/2007 | Karaguz et al. | |
| 2007/0130286 A1 | 6/2007 | Hopmann et al. | |
| 2007/0133569 A1* | 6/2007 | Lee et al. | 370/398 |
| 2007/0143749 A1 | 6/2007 | Date et al. | |
| 2007/0146782 A1 | 6/2007 | Lehotsky et al. | |
| 2007/0204150 A1 | 8/2007 | Jokela et al. | |
| 2007/0219963 A1 | 9/2007 | Soroca | |
| 2007/0253384 A1 | 11/2007 | Kanagala et al. | |
| 2007/0254609 A1 | 11/2007 | Rosenthal et al. | |
| 2007/0268506 A1 | 11/2007 | Zeldin | |
| 2007/0268514 A1 | 11/2007 | Zeldin | |
| 2007/0268515 A1 | 11/2007 | Freund et al. | |
| 2007/0268516 A1 | 11/2007 | Bugwadia et al. | |
| 2007/0276931 A1* | 11/2007 | Mahdavi et al. | 709/223 |
| 2007/0291945 A1 | 12/2007 | Chuang et al. | |
| 2008/0005319 A1 | 1/2008 | Anderholm et al. | |
| 2008/0008125 A1 | 1/2008 | Pham et al. | |
| 2008/0037552 A1* | 2/2008 | Dos Remedios et al. | 370/395.21 |
| 2008/0043989 A1* | 2/2008 | Furutono et al. | 379/269 |
| 2008/0049779 A1 | 2/2008 | Hopmann et al. | |
| 2008/0052384 A1 | 2/2008 | Marl et al. | |
| 2008/0065760 A1* | 3/2008 | Damm et al. | 709/224 |
| 2008/0070603 A1* | 3/2008 | Mao | 455/466 |
| 2008/0134164 A1* | 6/2008 | Stich et al. | 717/172 |
| 2008/0144660 A1* | 6/2008 | Godlewski | 370/468 |
| 2008/0175187 A1 | 7/2008 | Lowry et al. | |
| 2008/0216154 A1 | 9/2008 | Fontaine | |
| 2008/0243699 A1 | 10/2008 | Hilerio et al. | |
| 2009/0017832 A1 | 1/2009 | Tebbs et al. | |
| 2009/0019141 A1 | 1/2009 | Bush et al. | |
| 2009/0019147 A1 | 1/2009 | Ahlers et al. | |
| 2009/0019314 A1 | 1/2009 | Younger et al. | |
| 2009/0037606 A1* | 2/2009 | Diab | 709/247 |
| 2009/0046656 A1 | 2/2009 | Kitazoe et al. | |
| 2009/0055514 A1 | 2/2009 | Tebbs et al. | |
| 2009/0109897 A1 | 4/2009 | Woo | |
| 2010/0020694 A1* | 1/2010 | Jones | 370/235 |
| 2010/0035595 A1 | 2/2010 | Duggal et al. | |
| 2010/0093278 A1 | 4/2010 | Abel | |
| 2010/0250725 A1 | 9/2010 | Meenan et al. | |
| 2011/0047254 A1 | 2/2011 | Vainionpaa et al. | |
| 2011/0235549 A1 | 9/2011 | Ahlers et al. | |
| 2012/0008529 A1 | 1/2012 | Averbuch et al. | |
| 2013/0046722 A1 | 2/2013 | Hanson | |
| 2013/0250801 A1 | 9/2013 | Kennedy et al. | |

FOREIGN PATENT DOCUMENTS

| | | |
|---|---|---|
| EP | 1538792 | 6/2005 |
| EP | 1553729 | 7/2005 |
| EP | 1638258 | 3/2006 |
| EP | 1639751 A0 | 3/2006 |
| EP | 1701478 A1 | 9/2006 |
| EP | 1894314 A0 | 3/2008 |
| EP | 1965541 A1 | 9/2008 |
| EP | 2009877 | 12/2008 |
| EP | 2324652 A0 | 5/2011 |
| GB | 2411801 | 9/2005 |
| JP | 2001-222497 A | 8/2001 |
| JP | 2001-352328 A | 12/2001 |
| KR | 2004-0047209 A | 7/2004 |
| KR | 10-2005-0031175 A | 6/2005 |
| WO | WO2005/004401 | 1/2005 |
| WO | WO2007/001629 | 1/2007 |
| WO | WO2007/136804 | 11/2007 |
| WO | WO 2008/156898 | 12/2008 |
| WO | WO 2009/011962 | 1/2009 |
| WO | WO 2009/011963 | 1/2009 |
| WO | WO 2009/011964 | 1/2009 |
| WO | WO 2009/011965 | 1/2009 |
| WO | WO 2009/011966 | 1/2009 |
| WO | WO2010/016855 | 2/2010 |
| WO | WO 2011/119264 | 9/2011 |

OTHER PUBLICATIONS

U.S. Appl. No. 11/696,638, filed Apr. 4, 2007, entitled "Network Management Providing Network Health Information and Lockdown Security," Inventor(s) Steve Bush et al.

Marcia Zangrilli, et al., "Using Passive Traces of Application Traffic in a Network Monitoring System," copyright 2004 IEEE.

Kazuya Kubo, et al., "Hybrid Peer-to-Peer System for Network Monitoring of Field Devices," Downloaded May 14, 2009 at 10:08 from IEEE Xplore, copyright 2003 SICE, 6 pages.

International Search Report for International Application No. PCT/US2008/063335 mailed Sep. 22, 2008 (1 page).

Written Opinion of the International Searching Authority for International Application No. PCT/US2008/063335 mailed Sep. 22, 2008 (4 pages).

International Search Report for International Application No. PCT/US2008/063308 mailed Oct. 30, 2008 (2 pages).

Written Opinion of the International Searching Authority for International Application No. PCT/US2008/063308 mailed Oct. 30, 2008 (4 pages).

International Search Report for International Application No. PCT/US2008/063333 mailed Sep. 26, 2008 (2 pages).

Written Opinion of the International Searching Authority for International Application No. PCT/US2008/063333 mailed Spetember 26, 2008 (4 pages).

International Search Report for International Application No. PCT/US2008/059490 mailed Apr. 21, 2009 (2 pages).

International Preliminary Report on Patentability issued Oct. 6, 2009 (1 pages) and Written Opinion of the International Searching Authority mailed Apr. 21, 2009 (3 pages) for International Application No. PCT/US2008/059490.

Notification Concerning Transmittal of International Preliminary Report on Patentability (1 page), International Preliminary Report on Patentability (1 page), and Written Report of the International Searching Authority (4 pages) mailed Jan. 28, 2010 for International Application No. PCT/US2008/063318.

Microsoft TechNet, "The Cable Guy—Jun. 2004: The New Wireless Network Setup Wizard in Windows XP Service Pack 2," Published May 25, 2004; Updated Aug. 4, 2004, 10 pages; © 2010 Microsoft Corporation; http://technet.microsoft.com/en-us/library/bb878069.aspx.

(56) References Cited

OTHER PUBLICATIONS

Microsoft Corporation, "Windows Connect Now—UFD for Windows XP Specification," © 2010, Updated Sep. 15, 2006, 1 page; http://www.microsoft.com/whdc/connect/Rally/WCN-UFD_XPspec.mspx.
Microsoft Corporation, "Windows Connect Now—UFD for Windows XP," Version 1.1 © 2010—Sep. 15, 2006, 33 pages; http://www.microsoft.com/whdc/connect/Rally/WCN-Netspec.doc.
Microsoft Corporation, "Windows Connect Now—UFD and Windows Vista Specification," Version 1.0 © 2010—Sep. 15, 2006, 1 page; http://www.microsoft.com/whdc/connect/Rally/WCN-UFD_Vistaspec.mspx.
Microsoft Corporation, "Windows Connect Now—UFD Windows Vista" Version 1.0 © 2010—Sep. 15, 2006, 28 pages; http://www.microsoft.com/whdc/connect/Rally/WCN-UFD_Vistaspec.doc.
Microsoft Corporation, "Windows Connect Now—Access Point has No USB Port in Wireless Networking," © 2010, printed Mar. 24, 2010, 2 pages; http://www.microsoft.com/communities/newsgroups/en-us/default.aspx?dg=microsoft.public.windows.networking.wireless&tid=c55b567e-fec3-43be-8bd1-a3216125c7f9&cat=en_US_d02fc761-3f6b-402c-82f6-ba1a8875c1a7&lang=en&cr=&sloc=en-us&m=1&p=1.
Flip Video, "Quick Start Guide: FlipshareTV," © 2009 Cisco Systems, Inc., 19 pages; http://www.theflip.com/pdf/en-US/FlipShareTVQuickStartGuide.pdf.
"Wi-Fi Certified™ for Wi-Fi Protected Setup™: Easing the User Experience for Home and Small Office Wi-Fi® Networks," © 2007, 14 pages; http://www.wi-fi.org/files/kc/20090123_Wi-Fi_Protected_Setup.pdf.
"Cisco Access Router USB Flash Memory Module and USB eToken Hardware Installation Guide," © 2006 Cisco Systems, Inc., 12 pages; https://www.cisco.com/en/US/docs/routers/access/2800/hardware/notes/mithril.html.
"Wi-Fi Alliance™ for Wi-Fi Protected Setup Specification," Version 1.0h, Dec. 2006, 110 pages.
Byoung-Koo Kim/Jong-Su Jang/Tai M. Chung, Design of Network Security Control System for Cooperative Intrusion Detection, 2002, pp. 389-398.
International Preliminary Report on Patentability issued Jan. 19, 2010 (1 page) and Written Opinion of the International Searching Authority mailed Oct. 30, 2008 (4 pages) for International Application No. PCT/US2008/063308.
International Preliminary Report on Patentability issued Jan. 19, 2010 (1 page) and Written Opinion of the International Searching Authority mailed Sep. 26, 2008 (4 pages) for International Application No. PCT/US2008/063333.
International Preliminary Report on Patentability issued Jan. 19, 2010 (1 page) and Written Opinion of the International Searching Authority mailed Sep. 22, 2008 (4 pages) for International Application No. PCT/US2008/063335.
EPO Apr. 5, 2012 Search Report and Written Opinion from European Application 08769420.4; 8 pages.
PCT Aug. 25, 2011 International Search Report and Written Opinion of the International Searching Authority from International Application No. PCT/US2011/024462; 12 pages.
"Near Field Communication White Paper," Ecma International, 2005; 12 pages http://www.ecma-international.org/activities/Communications/tc32-tg19-2005-012.pdf.
"Universal Plug and Play Device Architecture, UPnP, Version 1.0," Microsoft Corporation, Protocols, Jun. 8, 2000; 54 pages;http://upnp.org/specs/arch/UPnPDA10_20000613.pdf.
EPO Nov. 15, 2007 European Search Report and Opinion from European Application No. EP07017509; 8 pages.
Khedr, Mohamed, et al., "Acan-Ad Hoc Context Aware Networks," Online! 2002, XP002300569; 5 pages; http://citeseerx.ist.psu.edu/viewdoc/summary?doi=10.1.1.20.1469.
Krishnamurthy, Lakshman, et al., "Meeting the Demands of the Digital Home with high-Speed Multi-Hop Wireless Networks," Intel Technology Journal, vol. 6, Nov. 15, 2002, pp. 57-68; http://download.intel.com/technology/itj/2002/volume06issue04/vol6iss4_interoperable_home_infrastructure.pdf.
PCT Oct. 27, 2004 International Search Report from International Application PCT/US2004/021429; 3 pages.
PCT Jan. 3, 2006 International Preliminary Report on Patentability and Written Opinion of the International Search Authority from International Application PCT/US2004/021429; 7 pages.
PCT Dec. 24, 2007 International Preliminary Report on Patentability and Written Opinion of the International Search Authority from International Application PCT/US2006/17500; 6 pages.
PCT Aug. 7, 2007 International Search Report from International Application PCT/US06/17500; 1 page.
PCT Nov. 21, 2008 International Preliminary Report on Patentability and Written Opinion of the International Search Authority from International Application PCT/US2007/012016; 5 pages.
PCT Jan. 4, 2008 International Search Report from International Application PCT/US07/12016; 1 page.
PCT Apr. 24, 2009 International Search Report from International Application PCT/US2008/08544; 2 pages.
PCT Aug. 2, 2011 International Preliminary Report on Patentability and Written Opinion of the International Search Authority from International Application PCT/US2008/08544; 7 pages.
Rasheed, Yasser, et al, "Home Interoperability Framework for the Digital Home," Intel Technology Journal, vol. 6, Nov. 15, 2002, pp. 5-16; http://download.intel.com/technology/itj/2002/volume06issue04/vol6iss4_interoperable_home_infrastructure.pdf.
Walker, Mark, et al., "Remote I/O: Freeing the Experience from the Platform with UPnP Architecture," Intel Technology Journal, vol. 6, Nov. 15, 2002, pp. 30-36; http://download.intel.com/technology/itj/2002/volume06issue04/vol6iss4_interoperable_home_infrastructure.pdf.
U.S. Appl. No. 13/029,335, filed Feb. 17, 2011, entitled "Network Management," Inventor(s) Steven M. Bush, et al.
U.S. Appl. No. 13/030,982, filed Feb. 18, 2011, entitled "Network Management," Inventor(s) Steven M. Bush, et al.
U.S. Appl. No. 13/031,121, filed Feb. 18, 2011, entitled "Network Management," Inventor(s) Steven M. Bush, et al.
Karygiannos, Tom, et al., "Wireless Network Security 802.11 Bluetooth and Handheld Devices," NIST Special Publication 800-48, Technology Administration, Dept. of Commerce, 2002, 119 pages.
U.S. Appl. No. 13/235,007, filed Sep. 16, 2011, entitled "Configuring a Secure Network," Inventor(s) Aaron H. Averbuch, et al.
"Bowman, Barb "Introduction to Windows XP Service Pack 2," Published Aug. 25, 2004, 8 pages; © 2010 Microsoft Corporation http://www.microsoft.com/windowsxp/using/security/expert/bowman_introtosp2.mspx".
PCT Oct. 11, 2012 Notification Concerning Transmittal of International Preliminary Report on Patentability and the International Preliminary Report on Patentability and Written Opinion of the International Searching Authority from Application No. PCT/US2011/024462; 9 pages.
EPO—Oct. 24, 2012 Response to Written Opinion from European Application 0876920.4; 21 pages.

* cited by examiner

HOME NETWORK OPTIMIZING SYSTEM

PRIORITY CLAIM

This application claims priority from U.S. Provisional Patent Application No. 60/949,628, filed Jul. 13, 2007, entitled "METHOD AND SYSTEM FOR MONITORING A HOME NETWORK," which is hereby incorporated by reference in its entirety as if fully set forth herein.

FIELD OF THE INVENTION

Embodiments of the present invention are directed generally toward computer networks and, more particularly, to monitoring and diagnostics of remote electronic networks.

BACKGROUND OF THE INVENTION

Home networks are growing exponentially in their complexity. We will shortly see home networks where the computer is merely one participant among many types of devices. The number of PCs attached to home networks will be dwarfed by other devices such as televisions and DVRs that are connected directly to the home network.

Except in rare cases, the user in the home will never be an IT expert or even have more than a very limited understanding of what a network does. As more and more devices use the home network, the burden of managing the network will rapidly grow beyond the capabilities of most home users. From the user's perspective, very simple tasks will seem as though they do not work, when in reality, they do work but are being hampered by a non-optimal network configuration or by events in the network they do not understand yet could control if they were armed with the appropriate information.

Consider the network environment illustrated in FIG. 1 and the following exemplary scenario. This represents a common "starter" broadband environment for many homes. The home has a single computer 155 ("Mom's computer") connected directly to a cable modem 150 providing broadband access to the Internet 107. The technical head of household has attached a USB camera 160 to mom's computer 155 and has set it up such that mom is able to engage in video chat sessions with her mother (i.e. grandma). This works very well for mom; she has singular access to the broadband channel into the home, which provides adequate bandwidth for a smooth audio/video stream to grandma.

This family has a daughter who has just received a laptop computer 170 for her birthday. As illustrated in FIG. 2, their network evolves to accommodate this addition. A wireless router 165 has been added to the network. The new laptop computer 170 is connected wirelessly to the router 165 and now the available bandwidth into the home from the Internet 107 is shared among multiple computers (i.e., computers 155, 170).

The daughter installs a particularly "chatty" peer-to-peer (p2p) file sharing application on her computer 170, and suddenly this high bandwidth application makes resources available from the connection to the Internet 107 relatively scarce.

Mom logs on to her computer 155 and starts a video session with Grandma. It is likely that Mom's chat session will begin to experience lost packets and "jitter" as she unknowingly competes with her daughter for bandwidth. Mom's experience will be degraded. She might have some vague notion that things seemed to get worse at some point after they installed the router 165. She might blame the router 165, she might blame the broadband service provider (BSP), she may simply live with the degraded experience and think there's nothing she can do about it, or she may simply give up and decide that video chat is not a viable option.

It's unlikely that, with no experience in networking, Mom will even begin to understand that her experience is being degraded as her network packets compete with her daughter's packets for a relatively scarce resource.

Furthermore, from the perspective of the BSP, they would rather that the scarce resource of the cable feed to this family's neighborhood not be saturated with p2p file sharing traffic.

Home network monitoring is very limited at present. For the most part it is limited to watching whether or not the Internet connection is active or whether link layer connectivity is functional on the local computer's network adapter. As the number of devices on the network increases, these limitations must be addressed.

BRIEF SUMMARY OF THE INVENTION

An embodiment of the invention includes a system for optimizing a network having a plurality of network devices. The system includes a network monitoring tool simultaneously executable on at least one of the network devices and configured to diagnose at least one condition of the network. The network monitoring tool includes an information collection module configured to collect an information set relating to performance of each of the network devices of the network, an action module configured to execute a predetermined action in response to at least a portion of the information set, the action relating to a diagnosed condition of the network, and an information transmission module configured to transmit via a wide-area network at least a portion of the information set to an electronic device remote from the network. The system further includes a configuring tool executable on a server computing device. The configuring tool includes an information receiving module configured to receive the information-set portion, and a programming module configured to configure via the wide-area network the network monitoring tool based on the received collected information.

BRIEF DESCRIPTION OF THE DRAWING

Preferred and alternative embodiments of the present invention are described in detail below with reference to the following figures.

DETAILED DESCRIPTION OF THE INVENTION

Figure 1:
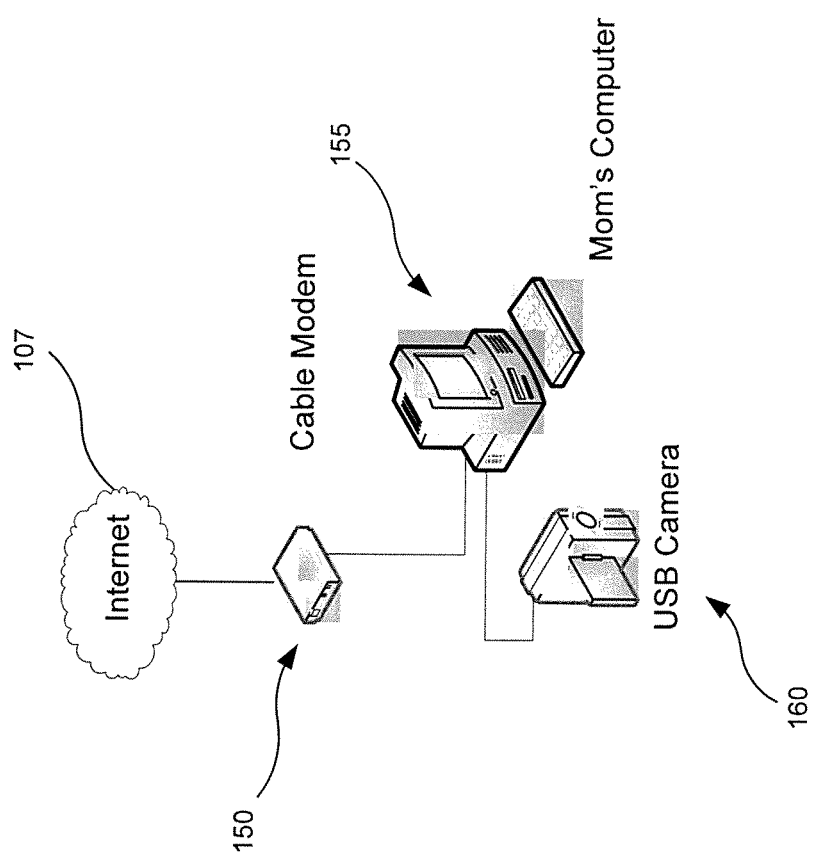
FIG. 1 is a functional block diagram of a prior art network operating environment.

An embodiment of the invention includes a home-network (client-side) monitoring system that provides for centralized configuration, troubleshooting and diagnosis of the home network environment. The system may be controlled via a third party such as a BSP responsible for the management of multiple client home networks. The system can upload data into a provider-managed (server-side) repository allowing the provider to analyze and reconfigure the customer's monitoring environment. Furthermore, diagnostics and performance data can be automatically fed by the client-side monitoring system into the provider's repository allowing for simplified troubleshooting steps in the event the customer calls the provider's technical support.

Data uploaded to the centralized system (e.g., the BSP) may be simple raw metric information or events that are generated in response to analysis of the raw metric information. For example, an embodiment might collect raw network usage statistics from each device in a home and upload that information every hour. Furthermore, there might be rules that generate an event whenever the network utilization from any one device crosses a threshold. Those events may be uploaded in addition to the raw data that is uploaded periodically. The raw metric information potentially provides a customer service representative (CSR) with valuable baseline (i.e., normal state) information for the customer, and events generated from the analysis of that information can provide information about specific points in time where the behavior of the network deviated from what is normal.

In an embodiment, the home-network monitoring system can be dynamically configured from a central (e.g., server-side) location as a basis for discovery. An embodiment of the invention described within includes a system that allows for dynamic and central configuration of a home-network monitoring system managed either locally or from a central location with no home user intervention. The client-side monitoring system can automatically push data into the repository and accept new rule and diagnostic configurations from the repository that modify the functionality of the client-side monitoring system. The data may be collected from individual computing devices in the home network. An embodiment can process data about the home network from a variety of device types using potentially many different protocols.

As earlier alluded to, diagnostic and performance information uploaded into the repository may be available to CSRs associated with the BSP for the following purposes:

a. Assisting with customer service calls. The CSRs can use the information uploaded from a customer site to help diagnose problems in that customer's network environment.

b. Analyzing data from all customers to provide new rules and diagnostics to be applied across the entire customer base.

Problem signatures that arise from the analysis of data uploaded to the repository can be used for developing new rules that identify such signatures. This allows the BSP to fix the problem remotely or provide information to the home network customer prior so as to potentially prevent the need to call a CSR for assistance.

An embodiment allows an entity, external to a home network, to control the rules governing monitoring data collected in the home network, such network having no standardized mechanism for collecting such data.

As will be more fully discussed hereinafter, the system allows the BSP to provision the collection of new data through simple modifications of a configuration file or through the addition of new configuration files associated with the client-side monitoring system. These modifications/additions can be facilitated through a push model whereby the BSP pushes the data to the home network or a pull model whereby the home network periodically checks for downloadable changes to be applied. The home network may check for such changes in response to a triggered rule.

An embodiment allows the BSP to provision new rules that perform analysis on arbitrary metrics through the modification of existing configuration files or the addition of new configuration files. Additionally, the BSP can provision new diagnostic operations to the home network through the modification of existing configuration files or the addition of new configuration files.

An embodiment is flexible enough to enable the BSP to push rules to a customer only when those rules are relevant to that particular customer's situation. Thresholds may be automatically tuned by software or tuned by a CSR to accommodate the user's environment.

Embodiments of the invention may incorporate or otherwise utilize a dedicated software application tool for managing small networks and described in detail in U.S. Provisional Patent Application No. 60/634,432, filed Dec. 7, 2004, entitled "Network Management" and naming Steve Bush et al. as inventors, and U.S. patent application Ser. No. 11/297,809, filed on Dec. 7, 2005, entitled "Network Management" and naming Steve Bush et al. as inventors, which applications, along with U.S. Provisional Patent Application No. 60/789,522, filed Apr. 4, 2006, entitled "Network Management," U.S. patent application Ser. No. 10/916,642, filed on Aug. 10, 2004, entitled "Service Licensing And Maintenance For Networks," U.S. patent application Ser. No. 11/457,783, filed on Jul. 14, 2006, entitled "Network Device Management," and U.S. patent application Ser. No. 11/457,763, filed on Jul. 14, 2006, entitled "Network Device Setup Utility," are incorporated entirely herein by reference.

Figure 3:
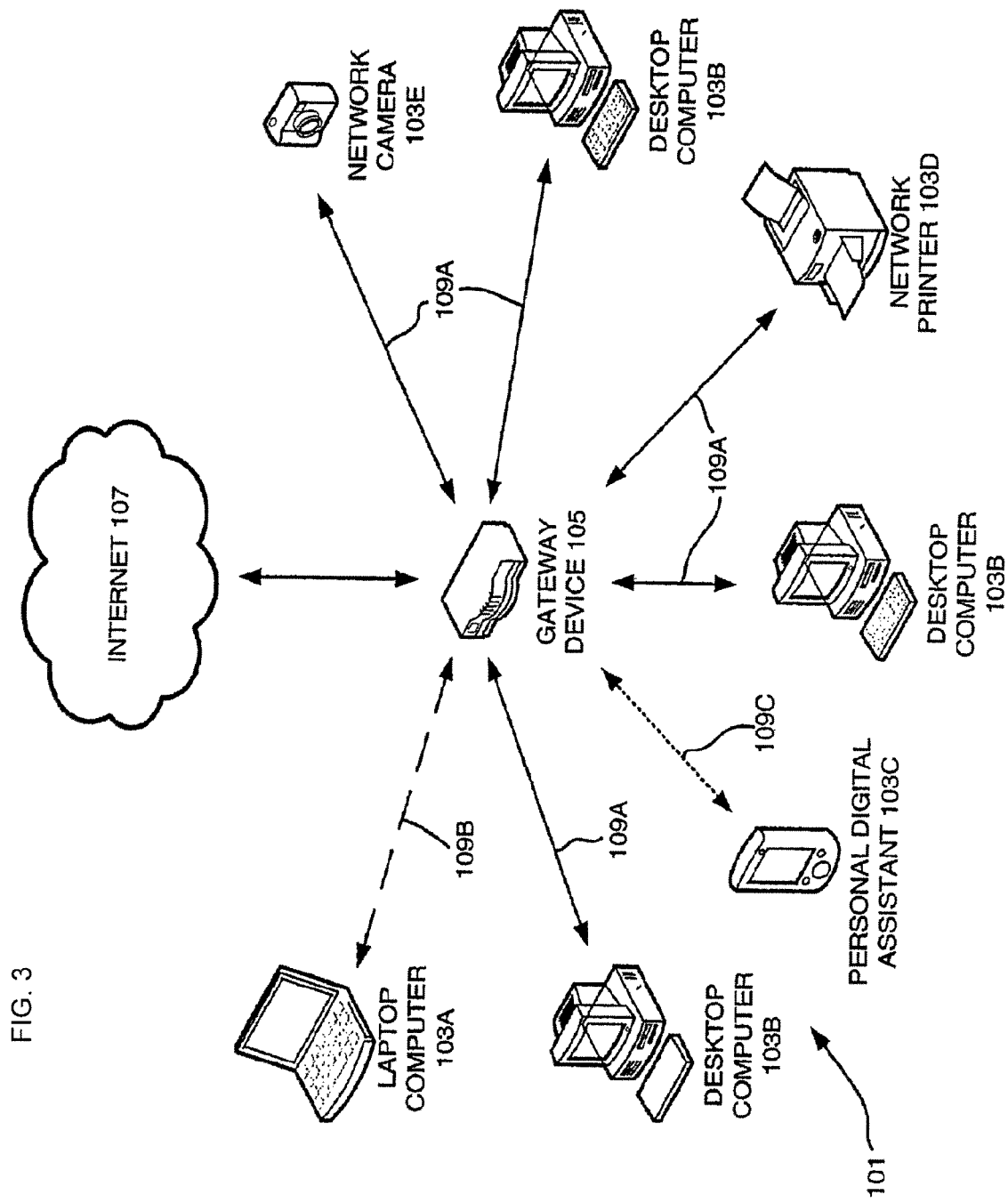
FIG. 3 is a functional block diagram of a network operating environment in which an embodiment of the present invention may be implemented.

As previously noted, various embodiments of the invention may be employed in connection with a small network. FIG. 3 illustrates an example of this type of small network. The network 101 may include a variety of different computing devices or "nodes". For example, the network 101 may include one or more laptop computers 103A, one or more desktop computers 103B, and one or more personal digital assistants 103C. In addition to these computers, the network 101 may also include one or more computing appliances, which are not as versatile as a conventional programmable computer, but which nonetheless may be configured to exchange data over a network. Such network appliances may include, for example, one or more printers 103D and one or more cameras 103E, as illustrated in FIG. 3. Other small networks that can be used with various aspects of the invention may include any suitable computing devices, such as telephones that exchange voice information in data packets (sometimes generically referred to as "Voice over Internet Protocol (VoIP) telephones), digital video recorders, televisions, streaming media players, and digital music servers, among others.

Each of these networked devices 103 communicates, either directly or indirectly, with a gateway or router device 105. In turn, the gateway device 105 typically will communicate with an external device or network. An external network may be another private network, or it may be a public network, such as the Internet 107. Thus, a gateway device is a device that can steer electronic data from one network to another network. Typically, a gateway device serves as a node on two incompatible networks (i.e., networks that use different communication protocol formats) and it can convert data from one network's communication protocol format into the other network's communication protocol format. As used herein, the term "small network" refers to a network made up of networked devices that each employ the same network address to communicate with the same gateway device, together with the gateway device itself.

The network devices 103 may be connected to the gateway device 105 using any suitable communication medium. For example, in the illustrated network 101, the desktop computers 103B are connected to the gateway device 105 through a hard-wired connection 109A (such as an Ethernet cable), while the laptop computer 103A is connected to the gateway device 105 through a IEEE 802.11 wireless connection 109B and the personal digital assistant 103C is connected to the gateway device 105 through a Bluetooth wireless connection 109C.

It should be appreciated that, as used throughout this application, the term "connect" and its derivatives (e.g., connection, connected, connects) includes both direct and indirect connections. Thus, with the network illustrated in FIG. 3, the laptop computer 103A may be connected to the gateway device 105 using a wireless transceiver incorporated into the laptop computer 103A and a wireless transceiver incorporated into the gateway device 105. Alternately, the laptop computer 103A may be connected to the gateway device 105 using a wireless transceiver external to the laptop computer 103, the gateway device 105, or both.

Typically, the gateway device 105 will be a router. As will be appreciated by those of ordinary skill in the art, a router routes data packets from the networked devices 103 to an external device or network. With some networks, however, the gateway device 105 alternately may be a computer performing router functions, a hub, a bridge, or "layer-3" switch. As will also be appreciated by those of ordinary skill in the art, the computing devices or "nodes" making up the network 101 can communicate with the gateway device 105 using one or more defined communication protocols, such as the Transmission Control Protocol (TCP) and the Internet Protocol (IP).

With these communication protocols, each computing device 103 and gateway device 105 in the network 101 can be assigned a logical address. For example, if the network 101 is connected to the Internet 107 through an Internet service provider, the Internet service provider can assign the gateway device 105 a logical Internet Protocol (IP) address. The Internet service provider may also provide the gateway device 105 with a block of logical Internet Protocol (IP) addresses for the gateway device 105 to reassign to each network device 103. Alternatively, the gateway device 105 can itself assign a range of logical Internet Protocol (IP) addresses to each network device 103, and then use a translation operation (e.g., a Network Address Translation (NAT) operation) to route data packets that it receives to the appropriate network device 103. This type of logical address typically is unrelated to the particular computing device to which it is assigned. Instead, a logical address identifies the relationship of that computing device to other computing devices in the network.

In addition to a logical address, each network device typically can also have a physical address. For example, most computing devices capable of communicating over a network, including routers, employ a network adapter with a media access control (MAC) address. This type of physical address is assigned to a network adapter according to standards (referred to as Project 802 or just 802 standards, which are incorporated entirely herein by reference) set forth by the Institute of Electrical and Electronic Engineers (IEEE). More particularly, these standards define a 48-bit and 64-bit physical address format for network devices. The first 14 bits of the address are assigned by the IEEE Registration Authority, and uniquely identify the manufacturer of the network adapter. The remaining bits are then assigned by the manufacturer to uniquely identify each network adapter produced by the manufacturer. Consequently, the physical address of a network adapter is unique across all networks unless manually changed by the user. The physical address is unique to the network adapter, and is independent of a computing device's relationship to other computing devices in a network. Thus, the physical address does not change over time or between uses in different networks.

A network may include both virtual devices and physical devices. Physical network devices can then include both computer devices and computing appliance devices. A "computer" may generally be characterized as a device that can be programmed to perform a number of different, unrelated functions. Examples of computers can thus include programmable personal computers, such as desktop computers and laptop computers. In addition, programmable media-purposed computers (e.g., "media adapters and servers"), network attached storage devices, programmable entertainment-purposed computers (e.g., video game consoles), some programmable personal digital assistants and some telephones (such as wireless "smart" telephones) may be characterized as computers in a network. A "computing appliance" then may generally be characterized as a device that is limited to primarily performing only specific functions. Examples of a computing appliance may thus include, for example, printers, cameras, telephones that exchange voice information in data packets (sometimes generically referred to as "Voice over Internet Protocol (VoIP) telephones or telephone adapters), digital video recorders, televisions, voice over Internet protocol (VoIP) adapters, print servers, media adapters, media servers, photo frames, data storage servers, routers, bridges and wireless access points.

As will be appreciated by those of ordinary skill in the art, there may be no clear defining line between "computer" network devices and "computing appliance" network devices in a network. For example, a sophisticated print server may be programmable to additionally or alternately function as a data storage server, while a programmable media-purposed computer or programmable personal digital assistant may have restricted functionality due to limited memory, input devices or output devices. Accordingly, as used herein, the term "computer" can refer to any network device that is capable of implementing a network management tool according to one or more aspects of the invention, such as a personal programmable computer. The term "computer appliance" then can refer to a network device that typically cannot implement a network management tool according to at least one aspect of the invention without additional augmentation. The term "computing device" is then used herein to include both computers and computing appliances.

With conventional networks located in a home, small office or other local environment, a network management tool according to various aspects of the invention can be implemented on a programmable personal computer, such as a desktop or laptop computer. A general description of this type of computer will therefore now be described.

Figure 4:
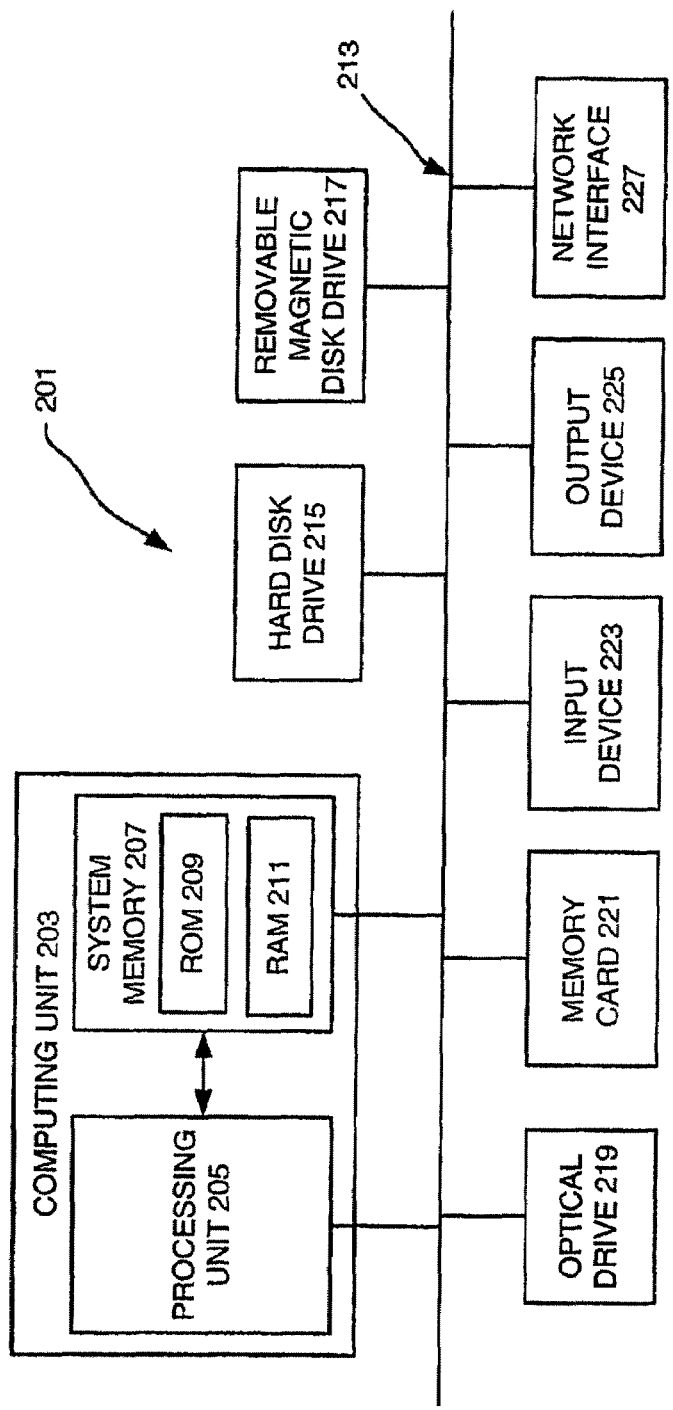
FIG. 4 is a functional block diagram of an operating environment in which an embodiment of the present invention may be implemented.

An illustrative example of such a computer 201 as may be present in the network 101 described above is illustrated in FIG. 4. As seen in this figure, the computer 201 has a computing unit 203. The computing unit 203 typically includes a processing unit 205 and a system memory 207. The processing unit 205 may be any type of processing device for executing software instructions, but can conventionally be a microprocessor device. The system memory 207 may include both a read-only memory (ROM) 209 and a random access memory (RAM) 211. As will be appreciated by those of ordinary skill in the art, both the read-only memory (ROM)

209 and the random access memory (RAM) 211 may store software instructions for execution by the processing unit 205.

The processing unit 205 and the system memory 207 are connected, either directly or indirectly, through a bus 213 or alternate communication structure to one or more peripheral devices. For example, the processing unit 205 or the system memory 207 may be directly or indirectly connected to additional memory storage, such as the hard disk drive 215, the removable magnetic disk drive 217, the optical disk drive 219, and the flash memory card 221. The processing unit 205 and the system memory 207 also may be directly or indirectly connected to one or more input devices 223 and one or more output devices 225. The input devices 223 may include, for example, a keyboard, touch screen, a remote control pad, a pointing device (such as a mouse, touchpad, stylus, trackball, or joystick), a scanner, a camera or a microphone. The output devices 225 may include, for example, a monitor display, television, printer, stereo, or speakers.

Still further, the computing unit 203 can be directly or indirectly connected to one or more network interfaces 227 for communicating with a network. This type of network interface 227, also sometimes referred to as a network adapter or network interface card (NIC), translates data and control signals from the computing unit 203 into network messages according to a communication protocol, such as the Transmission Control Protocol (TCP), the Internet Protocol (IP), and the User Datagram Protocol (UDP). These protocols are well known in the art, and thus will not be described here in more detail. An interface 227 may employ any suitable connection agent for connecting to a network, including, for example, a wireless transceiver, a power line adapter, a modem, or an Ethernet connection.

It should be appreciated that one or more of these peripheral devices may be housed with the computing unit 203 and bus 213. Alternately or additionally, one or more of these peripheral devices may be housed separately from the computing unit 203 and bus 213, and then connected (either directly or indirectly) to the bus 213. Also, it should be appreciated that both computers and computing appliances may include any of the components illustrated in FIG. 4, may include only a subset of the components illustrated in FIG. 4, or may include an alternate combination of components, including some components that are not shown in FIG. 4.

It should be noted that, while a general description of a programmable personal computer was provided above, various aspects of the invention may be implemented on any desired device capable of supporting embodiments of the invention. For example, with some aspects of the invention, the network management tool may be implemented on special purposed programmable computers, such as a programmable media or entertainment-purposed computers, or personal digital assistants. Accordingly, the above description of a programmable personal computer should be understood as illustrative rather than limiting.

A computing appliance may have any combination of the components of the computer 201 discussed above. More typically, however, a computing appliance can be simpler to optimize the performance of a specific function, and thus may have only a subset of these components. For example, a computing appliance may have only a computing unit 203, an input device 223 or an output device 225, and a network interface 227. As will be apparent from the following description, however, a computing appliance will have sufficient computing resources to implement a desired embodiment of the invention in order to provide information to or receive information from a client operating on a separate computing device.

Figure 5:
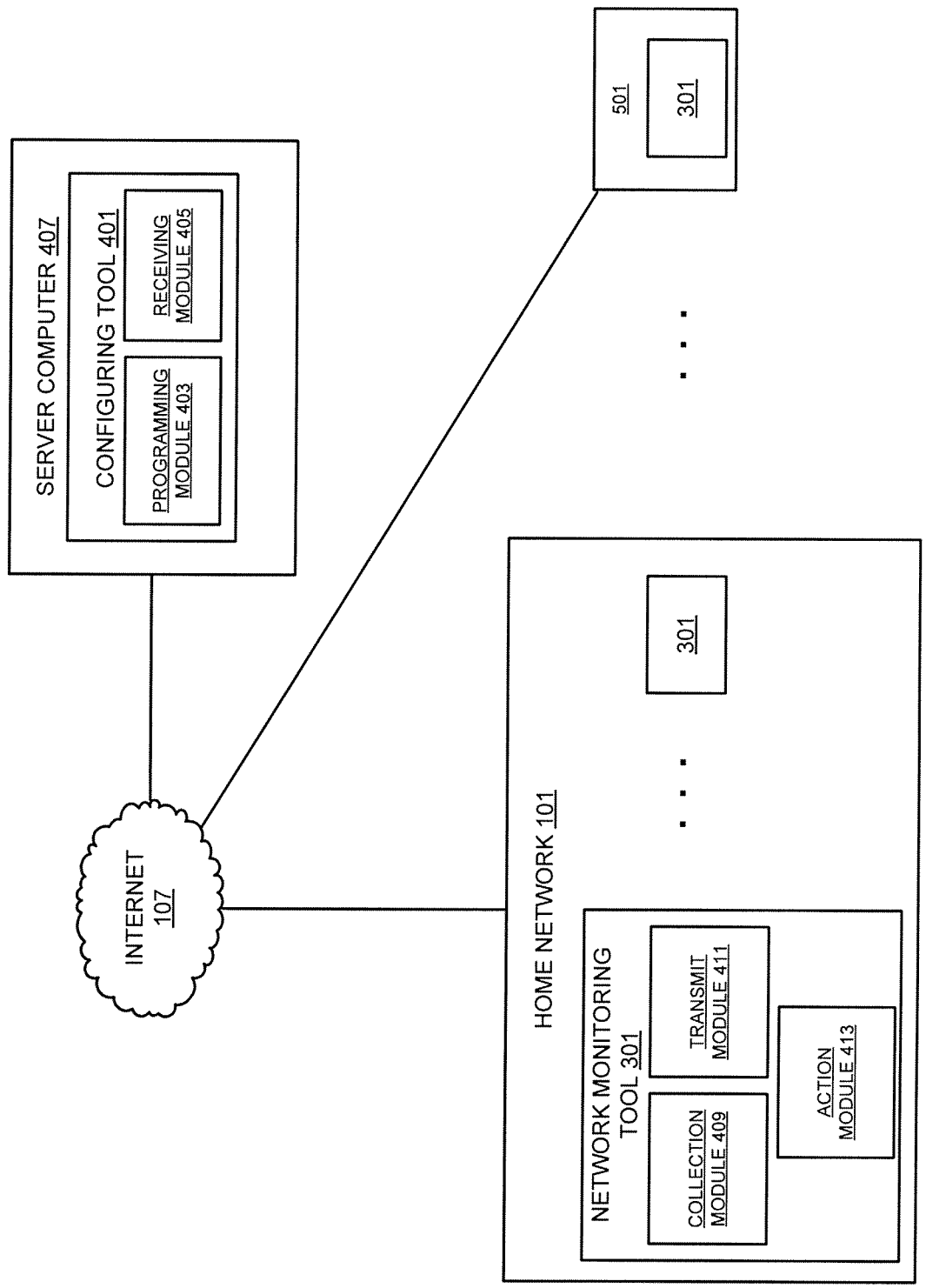
FIG. 5 is a functional block diagram of an embodiment of the present invention implemented in a network operating environment.

As shown in FIG. 5, with various embodiments of the invention an optimizing system may include a configuring tool 401 that includes a programming module 403 and a receiving module 405 implemented on a server computer 407 remote from the network 101. The server 407 and network 101 (as well as one or more additional networks 501) are remote from each other in at least the sense that there is at least one intermediary electronic device (e.g., Internet 107) separating the two.

As will be discussed more fully hereinafter, or as otherwise discussed in the patent applications incorporated by reference herein, one or more instantiations and/or components of a network monitoring tool 301 implemented on at least one computing device (not shown in FIG. 5) in the network 101 can provide network information to remote devices or entities, such as the configuring tool 401. As illustrated in FIG. 5, the tool 301 may include an information collection module 409, an action module 413 and an information transmission module 411, the functionality of each of which may be provided by one or more components discussed in greater detail below with reference to FIG. 6. Using the techniques described herein, or otherwise in the patent applications incorporated by reference herein, the information collection module 409 of the network management tool 301 of a computing device can collect a wide variety of information from which useful diagnoses and/or remedial measures can be prepared.

Figure 6:
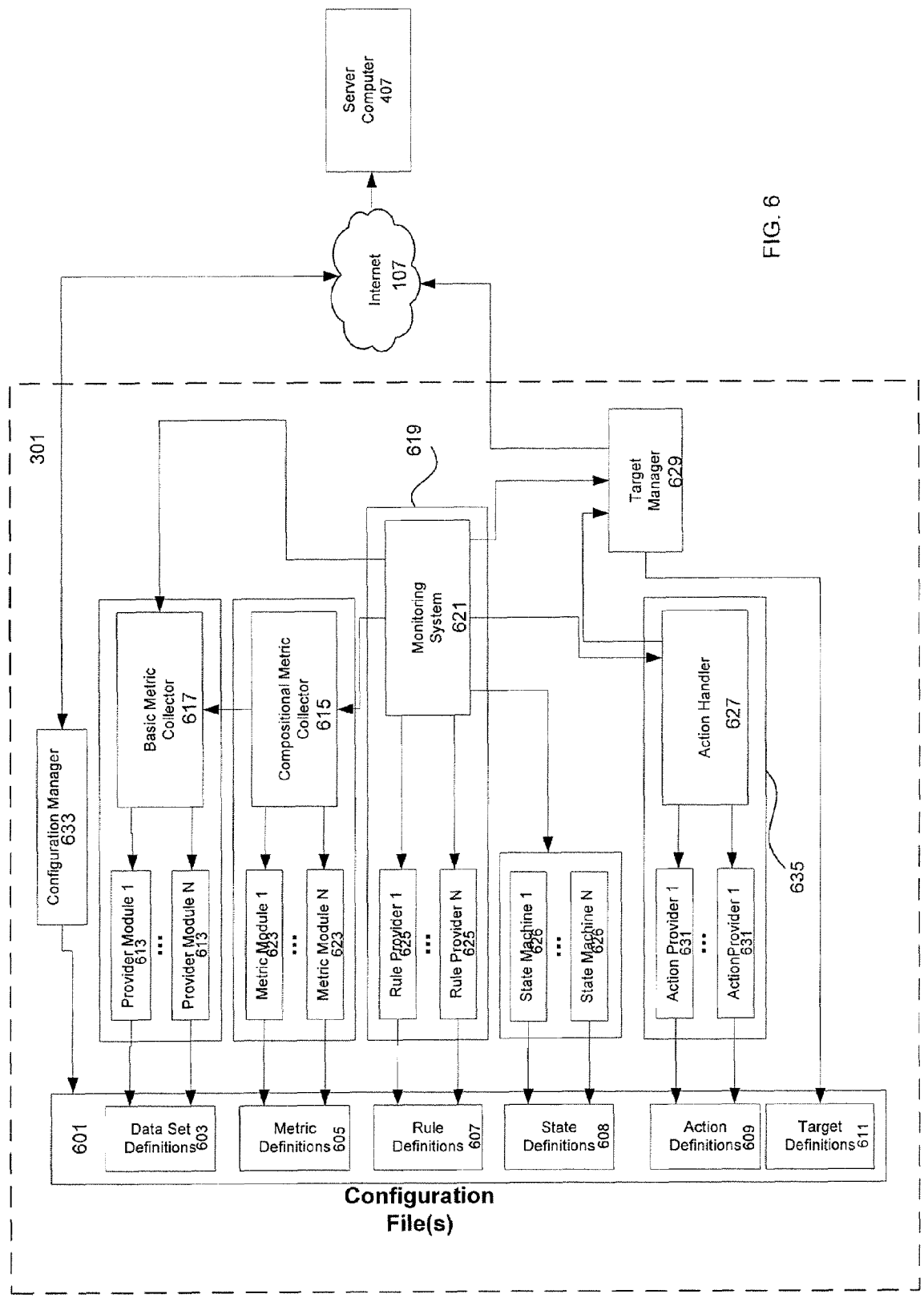
FIG. 6 is a functional block diagram of an embodiment of the present invention.

FIG. 6 is a schematic depiction of a network monitoring tool 301 according to an embodiment of the invention. Each of the various elements of the tool 301 is discussed below.

The tool 301 includes a set of configuration files 601. In an embodiment, the configuration file set includes data-set definitions 603, metric definitions 605, rule definitions 607, action definitions 609, target definitions 611, and state definitions 608. The updating and/or organization of the configuration files 601 may be controlled by a configuration manager component 633.

As will be discussed more fully hereinafter, the configuration file set 601 may be employed by the tool 301 in performing the following functions:

Basic-metric collection. The tool 301 includes collection modules (e.g., provider modules 613) that provide to the server 407 basic tables of data describing properties of the network 101 and states of network devices 103 through basic primitives including, but not limited to, numbers and strings. Basic metrics include simple measurements of state in the network 101 (e.g., received signal strength indication in a wireless network adapter). A network device 103 may collect basic metric information for itself or other devices in the network 101. Such a network device 103 may also leverage a peer-to-peer communication system (not shown) to forward basic metrics that it collects to other devices 103 in the network 101 for further analysis. Custom modules (not shown) can be added that provide the basic-metric information to the server 407 via conventional interfaces.

The tool 301 may be driven by a generic, easily extended and modified data file(s). For example, extensible markup language (XML) may be used to define this type of input. In an embodiment, the tool 301 may accommodate dynamically added and configured modules that can provide data from arbitrary sources. That is, the collection of data from specific hardware and/or computer systems of the network 101 may be implemented by small modules that provide data to the server 407 as tables of metrics as described above. The XML schema supports the creation and implementation of dynamically defined providers of data that can be added to the tool 301 on the fly.

Additionally, an embodiment may employ modules that include configuration data specific to the module and embedded within the module itself. For example, a new module might require configuration information that is specifically unique to it. The tool 301 supports the ability to provide that data such that it coexists with the rest of the monitoring configuration information defined in the tool.

- Compositional-metric determination and collection. The tool 301 defines a mechanism whereby basic metrics can be combined mathematically or logically into more complex primitives. That is, two basic metrics might be added together to form a more meaningful high level metric. For example, a compositional metric may be the sum of the total bytes out of a network adapter and total bytes into the network adapter.
- Rules. The tool 301 includes rules definitions 607 that compare metrics against a threshold value. In response to a positive comparison to the threshold value, an action is triggered. Rules link metrics and actions. Rules evaluate the state of a metric and, based on a predetermined condition, invoke an action or, optionally, trigger a state change.
- State definitions 608 allow for the system to define one or more state machines 626. Each state machine 626 includes a set of states. The state machine 626 has the notion of an active state. One of the states in its set of states is the start state which is by default the first active state.

Each state may have a set of one or more triggers that change the active state to one of the other states defined for the state machine 626. A trigger may be a rule as defined previously (e.g., a threshold is violated) or a period of time (e.g., execute this trigger after 20 seconds). When a trigger fires, the state machine changes the active state to a new state as defined for the firing trigger. When a state is entered it may invoke an action either immediately or after some period of time has passed.

An example of how a state machine 626 might be used is as follows: If only one person is using the network, it doesn't matter how much bandwidth they use. If two people are using the network, however, they are sharing a scarce resource. Restated, a computer using lots of bandwidth is only relevant if another computer is also attempting to use lots of bandwidth. As such, a state machine running on computer 1 may go into a "busy" state while that computer is busy or an "other busy" state when computer 2 is busy. Neither of those states represents a situation the user cares about. Consider computer 2 becoming busy (a trigger generated by the singular event of computer 2 becoming busy) while computer 1 is in the "busy" state or computer 1 becoming busy (a trigger generated by the singular event of computer 1 becoming busy) while in the "other busy" state. Either of these triggers may result in a state transition from the associated state to a state that invokes an action that alerts a user that there are two computers contending for limited bandwidth.

- Dynamic actions. Actions are defined in the configuration files 601. This allows the creation of modules that expose a conventional interface. In response to rule triggers, these actions can be invoked. Actions can be diagnostic in nature or they can present notifications to a user of the network 101. Actions may embody processes that automatically fix a network error condition without user intervention. For example, a frequent fix for many network problems is simply restarting the router. As a first response, an action might restart an HNAP-enabled router to attempt to clear up an error condition. Actions may be events that are triggered in response to some condition. An action might upload data to the server 407 or invoke some diagnostic on the network 101.

Examples might include the following:

i) Average network utilization statistics for every computer are uploaded on a timed basis;

ii) Sustained network utilization violating a threshold on multiple computers at the same time might generate an event that is uploaded to the CSR repository;

iii) In response to Internet connectivity being lost for more than five minutes, a diagnostic might reset an HNAP enabled router.

Figure 2:
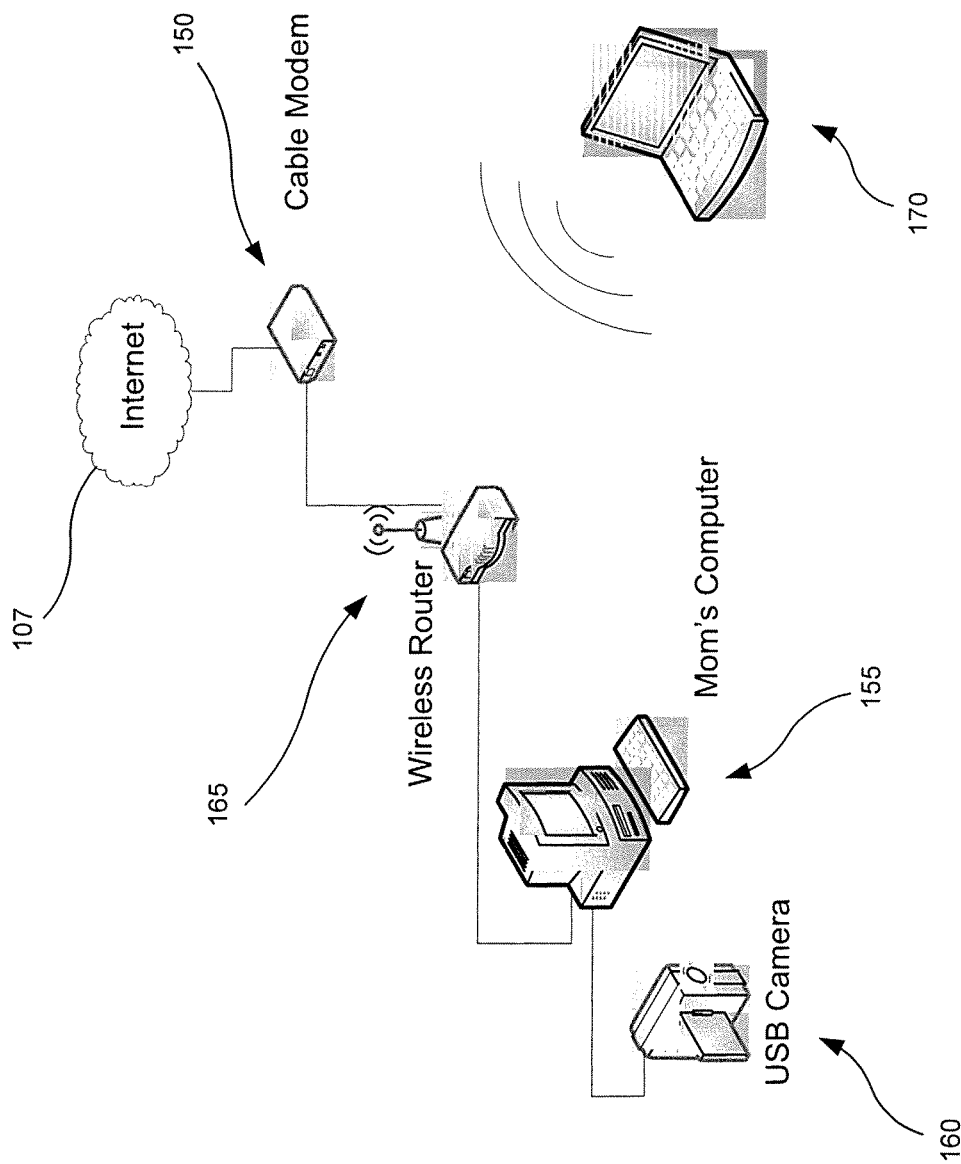
FIG. 2 is a functional block diagram of a prior art network operating environment.

With reference back to FIGS. 1 and 2, as well as to FIG. 6, the following discussion illustrates how an embodiment of the invention might be applied in such a way as to address the problems described with reference thereto.

The BSP providing service to the family described in the scenario is interested in tracking particular types of traffic and watching for certain types of traffic breaking a threshold. This can aid them in troubleshooting. Two events in the family's network are illustrative of how an embodiment provides value. The first is an event on the Internet that creates a scenario whereby the BSP wants to provision rules to its customers. The second is a scenario where two members of the family are simultaneously consuming large amounts of broadband bandwidth, thus impacting each other's performance.

The following sample rule file shows an exemplary implementation of a configuration file that might drive the rules engine 619 described herein to provide the BSP the tracking functionality they are looking for.

In this case, a new p2p file system "Foo" has been created and let loose on the Internet. The SSP is already tracking KAZZA® traffic through a configuration file provided to customers. The new configuration file, shown below, is provided to new and existing customers by the SSP. It has been modified to track the Foo system as well as KAZZA®. Existing customers will get this new configuration file when the rules engine 619 checks in to see if there are new configuration files 601 it should download.

```
<?xml version="1.0" encoding="utf-8"?>
<DiagnosticRules>
    <UploadTargets>
        <UploadTarget name="myBSP" url="http://www.mybsp.com" />
    </UploadTargets>
    <Providers>
        <Provider name="PacketSignatureProvider"
            assembly="PacketProvider.dll"
            class="PacketRuleProvider.PacketStatProvider"/>
        <Provider name="PerfCounterProvider"
            assembly="PerfRuleProvider.dll"
            class="PerfCounterProvider.PerfProvider"/>
    </Providers>
    <DataSets>
        <DataSet name="PacketSigStats"
            provider="PacketSignatureProvider" class="Performance"
            interval="5" id="BSP.PacketSigs" collect="Yes">
            <Instances>
                <Instance name="Ethernet0">
                    <SigFile name="Kazaa.sig">
                    <SigFile name="Foo.sig">
                </Instance>
            </Instances>
            <DataItems>
                <DataItem name="Packet Count"
  instanceDescriptor="PacketCount"/>
                <DataItem name="Byte Count"
                    instanceDescriptor="ByteCount"/>
```

```
        </DataItems>
      </DataSet>
      <DataSet name="ByteStats" provider="PerfCounterProvider"
            class="NetworkAdapterStats" interval="5"
            id="System.NetAdapterStats" collect="Yes">
        <Instances>
          <Instance name="Ethernet0"/>
        </Instances>
        <DataItems>
          <DataItem name="Bytes Out"
instanceDescriptor="BytesOut"/>
          <DataItem name="Bytes In" instanceDescriptor="BytesIn"/>
          <DataItem name="Packets In"
              instanceDescriptor="PktsIn"/>
          <DataItem name="Packets Out"
              instanceDescriptor="PktsOut"/>
        </DataItems>
      </DataSet>
    </DataSets>
    <Rules>
      <Actions>
        <Action id="PacketSigExceeded"
            class="HandlerApp.TriggerActions"
            method="ThresholdExceeded"/>
      </Actions>
      <Metrics>
        <Metric name="Bad Packet Monitor" id="PacketMonitor">
          <RunningAverage name="Average % Bad Packets"
              id="avgBadPackets" window="20">
            <DivideStatement>
              <PointValue name="Bad packet count"
              id="pvBadPackets"
                      dataSet="BSP.PacketSigs" row="PacketCount"/>
              <SumStatement>
                <PointValue name="Total Bytes Out"
id="pvBytesOut"
                      dataSet="System.NetAdapterStats"
row="PktsOut"/>
                <PointValue name="Total Bytes In"
id="pvBytesIn"
                      dataSet="System.NetAdapterStats"
row="PktsIn"/>
              </SumStatement>
            </DivideStatement>
          </RunningAverage>
        </Metric>
        <Metric name="Adapter usage" id="NetworkAdapterUsage">
          <RunningAverage name="Average network usage"
id="avgNetworkUsage" window="20">
            <SumStatement>
              <PointValue name="Total Bytes Out"
id="pvBytesOut"
                      dataSet="System.NetAdapterStats"
row="PktsOut"/>
              <PointValue name="Total Bytes In"
id="pvBytesIn"
                      dataSet="System.NetAdapterStats"
row="PktsIn"/>
            </SumStatement>
          </RunningAverage>
        </Metric>
      </Metrics>
      <Rule id="avgBadPacketsRising" name="Average Count of
          Suspect Packets" action="PacketSigExceeded"
          fireAlways="false" fireClear="true">
        <Rule.Description>The average number of packets matching a
            signature have exceeded a threshold
        </Rule.Description>
        <ThresholdRule metric="PacketMonitor" value="15"
type="lt"/>
      </Rule>
      <Rule id="avgBandwidthRising" name="Average network usage"
          fireAlways="false" fireClear="true" source="local">
        <ThresholdRule metric="PacketMonitor" value="35"
type="gt"/>
      </Rule>
      <Rule id="avgOtherBandwidthRising" name="Average network
          usage for other computers" fireAlways="false"
          fireClear="true" source="remote">
        <ThresholdRule metric="PacketMonitor" value="35"
type="gt"/>
      </Rule>
    </Rules>
    <StateMachines>
      <StateMachine name="WatchBandwidth">
        <State name="start">
          <Trigger rule="avgBandwidthRising"
nextState="ImBusy"/>
          <Trigger rule="avgOtherBandwidthRising"
nextState="OtherBusy"/>
        </State>
        <State name="ImBusy">
          <Trigger rule="avgOtherBandwidthRising"
nextState="NetworkBusy"/>
        </State>
        <State name="OtherBusy">
          <Trigger rule="avgBandwidthRising"
nextState="NetworkBusy"/>
        </State>
        <State name="NetworkBusy" action="NotifyUser">
        </State>
      </StateMachine>
    </StateMachines>
  </DiagnosticRules>
```

A section by section description of the exemplary implementation follows:

The Upload Targets section describes targets to which data may be uploaded. For example, if the BSP was provisioning a customer's computer with a monitoring configuration file, this is where they may define the Web service (e.g., server 407) where data should be uploaded to. In response to the triggering of some rule, the BSP might elect to have some set of data collected and shipped up to them once or each time it is collected on some fixed interval. This could provide extra detail for their CSR personnel in the event a customer calls with a problem. These targets may later be referenced in data collection sections or rule sections of the file.

The target manager 629 is responsible for processing these targets and moving data between other computers on the 101 and a remote network service provider (e.g., server 407). The monitoring system 621 or the action handler 627 might feed data to the target manager 629 for distribution. The monitoring system 621 may feed raw metrics as they are collected and the action handler may feed results of rule evaluations that triggered one or more actions.

```
  <UploadTargets>
    <UploadTarget name="myBSP"    url="http://www.mybsp.com"/>
  </UploadTargets>
```

In this example a single upload target is defined. It is a web service for the BSP that will receive event notifications from customers when a rule triggers an action that uploads event notifications to this upload target.

The provider modules 613 are configured to collect data. The two examples given provide two very different types of collection modules. This section defines modules 613 that can be used by the basic metric collector component 617 to collect raw state values from one or more network devices 103.

```
      <Providers>
        <Provider name="PacketSignatureProvider"
            assembly="PacketProvider.dll"
            class="PacketRuleProvider.PacketStatProvider"/>
```

```
        <Provider name="PerfCounterProvider"
            assembly="PerfRuleProvider.dll"
            class="PerfCounterProvider.PerfProvider"/>
    </Providers>
```

The first sample, PacketSignatureProvider is configured to read input files that define a signature for a type of packet. It analyzes every packet traversing one or more network adapters 105 in the network 101 and maintains counters about packets that match a particular signature. In an embodiment, this provider is created by the BSP, though it could just as easily have been created by a provider of the rules engine 619. It is, however, illustrative, in this case, of the BSP being able to modify the system on the fly.

The second sample, PerfCounterProvider is configured to collect information from WINDOWS® Performance counters. This is a general purpose protocol that allows collection of performance information pertaining to many entities in a computer running the WINDOWS® OS. The data is broken down into groups (for example network statistics or disk statistics). Each group contains multiple items (for example total bytes into a network adapter). Each of these statistics then is collected for one or more network adapters 105.

Both of these providers 613 are configured to collect metric data from specific sources and feed it back to the monitoring system 621 in a well-defined manner. These samples define the providers 613 in a construct that is compatible with, but not limited to, MICROSOFT® .NET managed code. An alternative embodiment could use COM.

Data set definitions 603 describe the raw metrics that are to be collected for analysis. A data set definition 603 defines parameters that drive an instance of a provider 613. Data sets 603 define what data is to be collected by the provider 613, how often it should be collected and other meta-data about the set including an ID that is later used to reference the data set. The interpretation of much of the meta-data is specific to the provider 613.

The basic metric collector 617 is configured to manage the non-provider specific information from the configuration file 601. The basic metric collector 617 is further configured to pass provider-specific information down to the provider module 613 for further configuration.

Consider the Sample:

```
<DataSets>
    <DataSet name="PacketSigStats"
        provider="PacketSignatureProvider" class="Performance"
        interval="5" id="BSP.PacketSigs" collect="Yes">
        <Instances>
            <Instance name="Ethernet0">
                <SigFile name="Kazaa.sig">
                <SigFile name="Foo.sig">
            </Instance>
        </Instances>
        <DataItems>
            <DataItem name="Packet Count"
    instanceDescriptor="PacketCount"/>
            <DataItem name="Byte Count"
                instanceDescriptor="ByteCount"/>
        </DataItems>
    </DataSet>
    <DataSet name="ByteStats" provider="PerfCounterProvider"
        class="NetworkAdapterStats" interval="5"
        id="System.NetAdapterStats" collect="Yes">
        <Instances>
            <Instance name="Ethernet0"/>
        </Instances>
        <DataItems>
            <DataItem name="Bytes Out"
    instanceDescriptor="BytesOut"/>
            <DataItem name="Bytes In" instanceDescriptor="BytesIn"/>
            <DataItem name="Packets In"
                instanceDescriptor="PktsIn"/>
            <DataItem name="Packets Out"
                instanceDescriptor="PktsOut"/>
        </DataItems>
```

The first data set defines the packet signature information to be collected by the tool 301. The name attribute defines a name that this data set will be known by. The second attribute provider references back to the definition of the provider 613 that is configured to provide information for the data definition that will follow. In this instance, it's the packet signature analyzer. Interval specifies how often counter metrics should be collected by the rules engine 619 and id provides a unique ID by which the data set will be referenced. The ID is concatenated to the name of the input file to form a complete id for the rules engine 619; therefore the ID need only be unique within this file.

The second data set is similar, except, in this case, the class attribute is advantageous. As specified previously, performance counters are broken down into groups. The class attribute in this case defines what group of performance counters the individual data items will be drawn from.

The provider 613 is configured to expose a table of data, in the case of the network adapter statistics, that is an extensive table with many elements. DataItems specify what values from the full set of data the provider 613 is configured to collect and that should be passed into the monitoring system 621 for analysis. For some providers 613, collecting a subset of an entire table provides performance gains over collecting the entire table.

Each data item has a "friendly name" and an instanceDescriptor that describes it to the provider 613. The instanceDescriptor is the key that the provider 613 uses to identify a row in a table of data and is specific to the type of provider 613. Of the many possible network statistics that can be collected for an adapter 105, the tool 301 may, for example, only be interested in the number of bytes and packets going in and coming out.

"Instances" may be used to describe explicit sources of data. In the case of network statistics, the tool 301 may need the name of an adapter 105. The PerfCounterProvider requires nothing more than this name to collect all statistics for an adapter 105. The "name" attribute specifies "Ethernet0" which is the Ethernet adapter in the device(s) executing the tool 301. As such, there could be multiple Ethernet adapters specified here; there is no reason it need be limited to 1.

"PacketSigStats" provides an interesting example. In this case, it may be desired that each instance represents the number of packets for a particular signature going through an adapter 105. It can then be seen that the first Instance element has the name attribute "Ethernet0" describing the same adapter seen already. The next two elements are specific to the packet signature provider. When the rules engine 619 reads the configuration file, it will pass down the XML tree below each Instance to the provider so it can further differentiate instances. Furthermore, the provider is allowed to define additional parameters that may be present in the XML input.

The name at each level is concatenated with prior levels to form a unique instance identifier. The packet signature instances would thus be known as "Ethernet0.Kazaa.sig" and "Ethernet0.Foo.sig". Individual data items from this provider will apply to the most granular name (e.g., Ethernet0.Foo.sig as opposed to simply Ethernet0).

Returning to the illustrative scenario, this data set defines the counters necessary to track the number of packets being generated for each signature on individual network adapters. The initial deployment to the customers might simply define the KAZZA® signature. At a later point in time, the SSP may decide that they need to track Foo and provision a new file that defines a signature file and collection definition for that case.

In the second instance, no additional information beyond the network adapter name(s) are required.

Action modules 631 are modules that can be invoked in response to some trigger condition being activated.

The sample discussed herein leverages MICROSOFT® .NET namespaces and assemblies to define methods that can be called.

The action handler 627 reads the action definitions 609 and is responsible for managing the individual action providers 631.

Consider the sample input file.

```
<Actions>
    <Action id="PacketSigExceeded"
class="HandlerApp.TriggerActions" method="ThresholdExceeded"/>
</Actions>
```

The "id" attribute is simply a name for the action.

The "class" attribute defines a namespace and a class that can be created to invoke the action.

The "method" attribute defines a method (or function) within the class to invoke the action.

This concept could accommodate other types of action definitions, such as a COM creatable class with a set of IDispatch methods.

There may be additional "built in" actions provided by the action engine 635 itself that might, for example, upload the event to a specified upload target.

Metric modules 623 define aggregations of raw data collected in data sets. The metric modules 623 are specific data handlers that operate on the raw data to combine or analyze it in some way. The attributes on the primary metric element define how the metric is referenced later. The sub-elements define how the raw data is handled, what data fields are acted upon and from what providers they come.

```
<Metrics>
    <Metric name="Bad Packet Monitor" id="PacketMonitor">
        <RunningAverage name="Average % Bad Packets"
        id="avgBadPackets"
            window="20">
            <DivideStatement>
                <PointValue name="Bad packet count"
                id="pvBadPackets"
                    dataSet="BSP.PacketSigs" row="PacketCount"/>
                <SumStatement>
                    <PointValue name="Total Bytes Out"
                    id="pvBytesOut"
                        dataSet="System.NetAdapterStats"
                        row="PktsOut"/>
                    <PointValue name="Total Bytes In"
                    id="pvBytesIn"
                        dataSet="System.NetAdapterStats"
                        row="PktsIn"/>
                </SumStatement>
```

```
            </DivideStatement>
        </RunningAverage>
    </Metric>
    <Metric name="Adapter usage" id="NetworkAdapterUsage">
        <RunningAverage name="Average network usage"
id="avgNetworkUsage" window="20">
            <SumStatement>
                <PointValue name="Total Bytes Out"
                id="pvBytesOut"
                    dataSet="System.NetAdapterStats"
                    row="PktsOut"/>
                <PointValue name="Total Bytes In"
                id="pvBytesIn"
                    dataSet="System.NetAdapterStats"
                    row="PktsIn"/>
            </SumStatement>
        </RunningAverage>
    </Metric>
</Metrics>
```

Returning to our sample we see how we can combine multiple metrics from the tables and instances we have thus far defined to form a single combinational metric that we can use later in rules.

The sample defines a metric with the id PacketMonitor that is the running average of an equation that combines the data defined thus far. Window is a value specific to the RunningAverage metric type that defines how many samples the metric should be measured over.

Ultimately, the metrics defined here, while potentially rather complex, provide a simple result to rules that can then be able to perform simple comparisons against a threshold value and invoke an action in response.

There may be a set of metric types built into the tool 301. This set may include the aforementioned "RunningAverage" metric type. The tool 301 supports dynamic metric type providers in much the same way as actions are supported. This allows the tool 301 to be extended on the fly with new metric types.

The long set of XML beginning with <DivideStatement> defines a number that can be fed to running average and then to a rule.

The <DivideStatement> element has two children; one is a "point value" and the other is yet another arithmetic operation. This means that the first value is divided by the second to yield the final value that is fed to a running average component of the compositional metric collector 615.

Point Value refers back to a specific instance of a value thus far defined. It should be apparent that this refers back to the PacketCount row from the provider that analyzes packet signatures.

The <SumStatement> element is similar. It references two more points values pulled out of the network stats table. PktsOut and Pktsin added together result in the total number of packets through an adapter.

Therefore the result of the equation is the total number of packets matching a signature divided by the total number of packets through the network adapter (i.e., the percentage of packets that match a signature).

The PacketMonitor metric is thus the running average over 20 samples of this equation.

What may be unclear at this point is to what these metrics apply (i.e., which instances). Recall that there are two instances tracked by the packet signature provider: Ethernet0.Kazaa.sig and Ethernet0.Foo.sig. There is one instance tracked by the network provider: Ethernet0.

If all individual data items in the metric resolve to exactly the same instances, then it is fairly evident how many individual metrics will be generated on each collection of the metric.

If they are different, as in this case, the number of individual metrics will be equal to the number of metric instances produced by the data set with the greatest number of instances. In an embodiment, data item names must share the same prefix or they cannot be combined. To further clarify: We have a total number of packets through the adapter Ethernet0. We then have two counters relative to Ethernet0: Kazaa.sig and Foo.sig. Ultimately the two equations that we evaluate are:

Ethernet0.Kazaa.sig.PacketCount/(Ethernet0.PktsOut+Ethernet0.PktsIn)

Ethernet0.Foo.sig.PacketCount/(Ethernet0.PktsOut+Ethernet0.Pktsin)

Returning to the exemplary scenario, the BSP has now easily defined a method for tracking the percentage of packets on each adapter 105 that match a particular signature. The monitoring system 621 handles many of the details, and the BSP has largely produced a few simple components and a modified input file.

Furthermore, an additional metric identified as "NetworkAdapterUsage" is defined that measures the running average of network traffic through the adapter.

Rules define analyses on metrics that may result in an action. Information about when the rule fires, how it should be referenced elsewhere in the tool 301 and its description are among the attributes defined.

The monitoring system 621 is responsible for reading the definition of rule providers 625 and managing the flow of data coming from one or more of the metric providers 613, 623. Positive responses from rules result in the monitoring system 621 invoking one or more actions through the action handler 627.

Sub-elements define what metric(s) are used and to what they are compared to result in a triggering of the rule.

Consider the following sample:

```
<Rule id="avgBadPacketsRising" name="Average Count of
    Suspect Packets" action="PacketSigExceeded"
    fireAlways="false" fireClear="true">
  <Rule.Description>The average number of packets matching a
    signature have exceeded a threshold
  </Rule.Description>
  <ThresholdRule metric="PacketMonitor" value="15"
    type="gt"/>
</Rule>
```

This rule takes the PacketMonitor metric defined previously and compares it against the value 15. The "type" attribute indicates that it is a "greater than" threshold, so if the value of PacketMonitor rises above 15 the "PacketSigExceeded" action will be triggered.

Any of these actions may invoke the target manager 629 to forward data around the network 101 or to an external target (e.g., server 407) through the Internet 107.

The original scenario presented the problem wherein a teenage child in the family installed a P2P file sharing program that flooded the network with traffic and impacted mom's ability to engage in video chat sessions with Grandma.

There really was no information provided to the user or the BSP that would help them isolate why, after the router was installed, Mom suddenly experienced degraded performance.

An embodiment of the system described herein allows the BSP to provide a monitoring configuration file, such as the sample file described above herein, in response to the establishment of the home LAN and changing conditions in the Internet that will enable the BSP to more accurately respond to customer inquiries.

For example, if Mom calls the BSP in this scenario and this system has been running, it will be obvious that a significant portion of network traffic is dominated by the daughter's pc running this P2P application. The customer service representative can then instruct the customer to shut this application down on their teenager's computer and perhaps instruct them how to prevent their daughter from running as an administrator so she can't install such applications at all.

Of course, there's no reason why the system cannot be more proactive. Recall that rules trigger arbitrary actions that are defined in input files. The system could notify Mom's computer that this is happening and instruct her on how to remedy the situation without the involvement of the CSR.

An embodiment of the invention allows for metrics to be collected conditionally. This functionality allows, for example, a rule to trigger the collection of metrics for the purpose of diagnostics.

The monitoring system 621 can load new rules on the fly. For example, either a primary declaration file can be rebuilt and loaded or extra configuration files 601 can be loaded in on the fly.

An embodiment of the invention allows for aggregated data to be fed from the monitoring system 621 up to a higher level entity outside the home network 101, such as the BSP, for example. This allows the BSP to define data that is interesting, have it collected by the tool 301, and fed into a central repository, such as server 407. The BSP can analyze this data to develop new rules and metrics that can allow them to feed new schemas down to respective tools 301 running on customer networks that detect and solve problems programmatically. The target manager 629 facilitates communication with the network service provider/BSP.

Two other rules are defined:

```
<Rule id="avgBandwidthRising" name="Average network usage"
    fireAlways="false" fireClear="true" source="local">
  <ThresholdRule metric="PacketMonitor" value="35"
    type="gt"/>
</Rule>
<Rule id="avgOtherBandwidthRising" name="Average network
    usage for other computers" fireAlways="false"
    fireClear="true" source="remote">
  <ThresholdRule metric="PacketMonitor" value="35"
    type="gt"/>
</Rule>
```

These rules monitor how busy network adapters are both on a local device 103 and on other devices in the network 101. A new concept introduced in these rules is the "source" attribute. On the first rule "avgBandwidthRising," the source is specified as local. This means that as raw metric tables are collected and shared around the network 101, this rule will only fire for raw data tables collected on this device 103. The other rule specifies the source as "remote" meaning that the rule will only fire for raw data tables collected from other devices on the network 101. The rule will fire locally but it will only be in response to receiving a table of raw data from another device 103 and evaluating the rule locally on that data.

State machines 626 define interactions of rules into a flowchart of states, any one of which might invoke an action. Consider the scenario where the user is notified if he is consuming a significant amount of bandwidth and someone else on the network 101 is as well. The following state machine definition describes how this situation might be detected:

```xml
<StateMachines>
    <StateMachine name="WatchBandwidth">
        <State name="start">
            <Trigger rule="avgBandwidthRising" nextState="ImBusy"/>
            <Trigger rule="avgOtherBandwidthRising" nextState="OtherBusy"/>
        </State>
        <State name="ImBusy">
            <Trigger rule="avgOtherBandwidthRising" nextState="NetworkBusy"/>
        </State>
        <State name="OtherBusy">
            <Trigger rule="avgBandwidthRising" nextState="NetworkBusy"/>
        </State>
        <State name="NetworkBusy" action="NotifyUser">
        </State>
    </StateMachine>
</StateMachines>
```

Recall that if only one device 103 is busy, that is not a condition that requires notification to the user. However, if multiple devices 103 are busy, then the user may be impacted and an embodiment should detect this.

This example shows one StateMachine element with multiple states. In practice there could be multiple StateMachine elements. The first state, named "start" in the XML has rules that trigger a move to a new state. If the previously defined "avgBandwidthRising" rule is triggered, the state machine moves to the "ImBusy" state. This means that an embodiment has detected that the local computer is busy.

If the "avgOtherBandwidthRising" state is triggered, an embodiment moves to a state, "OtherBusy" where the tool 301 has detected that another computer on the network 101 is busy.

From these two states, the tool 301 can move to a state, "NetworkBusy" where it has detected that the local device 103 is busy and another device of the network 101 is busy thus requiring user notification. The "NetworkBusy" state has an attribute action that will be invoked when the state is entered. The "NotifyUser" action can be defined as previous actions are defined and might upload the fact that the state has been reached to the server 407 or might let the user know that a condition has arisen in which they might experience degraded performance.

In practice, triggers can also be defined that result in a return to a prior state. For example, if the state machine 626 is in the ImBusy state, then, if the bandwidth dropped back below the threshold, the state machine can transition back to the start state.

An embodiment of the invention may allow for defining how data can be shared with other monitoring system 621 instances around the network 101. The target manager 629 facilitates this sharing as well as uploading data across the Internet 107.

While embodiments of the invention have been described with respect to specific examples including presently preferred modes of carrying out the invention, those skilled in the art will appreciate that there are numerous variations and permutations of the above described systems and techniques that fall within the spirit and scope of the invention as described herein.

What is claimed is:

1. An apparatus, comprising:
one or more processors; and
logic encoded in one or more tangible media for execution by the one or more processors, and when executed operable to:
collect a first information set relating to performance of each network device in a first network having a plurality of network devices, wherein the first information set includes an instance identifier, which is formed by concatenating several names associated with data passing through at least one adapter;
execute a predetermined action in response to at least a portion of the first information set, the predetermined action relating to a diagnosed condition of the first network, wherein an evaluation is executed for different instances of data being delivered to a first network device and a second network device respectively, the first and second network devices being part of the network devices of the first network, wherein the predetermined action is configured to terminate a first connection of the first network device engaged in a peer-to-peer (P2P) application after communicating an alert message to the second network device, and wherein the predetermined action is configured to transmit, via a wide-area network, a configuration request and at least a portion of the first information set to an electronic device remote from the first network, and wherein the alert message is indicative of bandwidth consumption for the first network device exceeding a threshold defined in the predetermined action; and
receive, from a programming module outside of the first network, configuration data to mitigate the bandwidth consumption for the first network device exceeding the threshold.

2. The apparatus of claim 1, further comprising:
a network monitoring tool simultaneously executable on at least one network device of a plurality of network devices of a second network and configured to diagnose at least one condition of the second network, the network monitoring tool comprising:
an information collection module configured to collect a second information set relating to each of the network devices of the second network, and
an information transmission module configured to transmit at least a portion of the second information set to an electronic device remote from the second network; and
wherein an information receiving module is configured to receive the second information-set portion, and
the programming module is configured to configure the configuration data based on the second information-set portion.

3. The apparatus of claim 2 wherein the programming module is further configured to configure the network monitoring tool based on the first information-set portion.

4. The apparatus of claim 1 wherein a first network monitoring tool comprises a set of at least one configuration files enabling the programming module to configure the first network monitoring tool.

5. The apparatus of claim 4 wherein the first network monitoring tool further comprises a rules engine configured to evaluate the first information-set portion and, based on at least one rule of the configuration-file set, invoke the predetermined action.

6. The apparatus of claim 4 wherein the programming module configures the first network monitoring tool by populating the configuration-file set with a set of at least one rules.

7. The apparatus of claim 1 wherein the predetermined action comprises invocation of a diagnostic operation for determining a status of a selected one of the network devices.

8. The apparatus of claim 4 wherein the programming module configures the first network monitoring tool by populating the configuration-file set with a set of at least one diagnostic descriptions.

9. The apparatus of claim 4, wherein the programming module configures the first network monitoring tool by populating the configuration-file set with a set of at least one rules, at least one of the rules being created in response to receiving the configuration request.

10. A method of optimizing a first network having a plurality of network devices, the method to be implemented in an electronic environment in which a processor is involved in routing packets in a network environment, the method comprising:

providing via a wide-area network a first network monitoring tool to the first network, the first network monitoring tool simultaneously executable on at least one of the network devices, the first network monitoring tool configured to diagnose at least one condition of the first network;

automatically collecting from the first network a first information set relating to performance of each of the network devices of the first network, wherein the first information set includes an instance identifier, which is formed by concatenating several names associated with the data passing through at least one adapter;

automatically configuring via the wide-area network the first network monitoring tool based on the first information set;

evaluating the first information-set portion and invoking a predetermined action related to a diagnosed condition of the first network, wherein an evaluation is executed for different instances of data being delivered to the first network device and a second network device respectively, the first and second network devices being part of the network devices of the first network, wherein the predetermined action is configured to terminate a first connection of the first network device engaged in a peer-to-peer (P2P) application after communicating an alert message to the second network device, and wherein the predetermined action is configured to transmit, via the wide-area network, a configuration request and at least a portion of the first information set to an electronic device remote from the first network, and wherein the alert message is indicative of bandwidth consumption for the first network device exceeding a threshold defined in the predetermined action; and receiving, from a programming module outside of the first network, configuration data to mitigate the bandwidth consumption for the first network device exceeding the threshold.

11. The method of claim 10, further comprising the steps of:

providing via the wide-area network a second network monitoring tool to a second network, the second network monitoring tool simultaneously executable on at least one network device of a plurality of network devices of the second network, the second network monitoring tool configured to diagnose at least one condition of the second network;

automatically collecting from the second network a second information set relating to performance of each of the network devices of the second network; and automatically configuring via the wide-area network the first network monitoring tool based on the second information set.

12. The method of claim 11, further comprising the step of configuring the second network monitoring tool based on the first information-set portion.

13. The method of claim 10 wherein the first network monitoring tool comprises a set of at least one configuration files enabling the automatic configuration of the first network monitoring tool.

14. The method of claim 13 wherein the first network monitoring tool further comprises a rules engine configured to evaluate the first information-set portion and, based on at least one rule of the configuration-file set, invoke a predetermined action related to a diagnosed condition of the first network.

15. The method of claim 13 wherein configuring the first network monitoring tool comprises populating the configuration-file set with a set of at least one rules.

16. The method of claim 14 wherein the predetermined action comprises invocation of a diagnostic operation for determining a status of a selected one of the network devices.

17. The method of claim 13 wherein configuring the first network monitoring tool comprises populating the configuration-file set with a set of at least one diagnostic descriptions.

18. The method of claim 16, wherein configuring the first network monitoring tool comprises populating the configuration-file set with a set of at least one rules, at least one of the rules being created in response to receiving the invoked diagnostic.

19. The method of claim 10 wherein the first network monitoring tool is configured in response to receiving a configuration request from the first network.

20. The method of claim 10, further comprising the step of using the first information set to provide electronic customer service assistance to a proprietor of the first network.

* * * * *